United States Patent
Ostermann et al.

(10) Patent No.: US 8,909,026 B2
(45) Date of Patent: Dec. 9, 2014

(54) METHOD AND APPARATUS FOR SIMPLIFYING THE ACCESS OF METADATA

(75) Inventors: Ralf Ostermann, Hannover (DE); Hui Li, Hannover (DE); Meinolf Blawat, Hannover (DE); Marco Winter, Hannover (DE)

(73) Assignee: Thomson Licensing, Issy-les moulineaux (FR)

( * ) Notice: Subject to any disclaimer, the term of this patent is extended or adjusted under 35 U.S.C. 154(b) by 1103 days.

(21) Appl. No.: 11/906,284

(22) Filed: Oct. 1, 2007

(65) Prior Publication Data

US 2008/0043836 A1 Feb. 21, 2008

Related U.S. Application Data

(62) Division of application No. 10/155,371, filed on May 23, 2002, now Pat. No. 7,295,755.

(30) Foreign Application Priority Data

Jun. 22, 2001 (EP) ..................................... 01115226
Mar. 26, 2002 (EP) ..................................... 02006879

(51) Int. Cl.
- *H04N 9/80* (2006.01)
- *G11B 27/32* (2006.01)
- *G11B 27/034* (2006.01)
- *G06F 17/30* (2006.01)
- *G11B 27/10* (2006.01)
- *H04N 5/85* (2006.01)

(52) U.S. Cl.
CPC ........ *G06F 17/30817* (2013.01); *G11B 27/329* (2013.01); *G11B 27/034* (2013.01); *G11B 27/105* (2013.01); *H04N 5/85* (2013.01); *G11B 2220/2562* (2013.01)
USPC .............................. 386/248; 386/239; 386/240

(58) Field of Classification Search
CPC ............... H04N 5/85; G06F 17/30817; G11B 2220/2362; G11B 27/329; G11B 27/105
USPC ............ 725/22, 39, 46, 47, 87; 386/239, 240, 386/326, 328–334, 248, 264
See application file for complete search history.

(56) References Cited

U.S. PATENT DOCUMENTS 7,003,213 B1    2/2006  Hasegawa
7,233,948 B1 *  6/2007  Shamoon et al. .................... 1/1

(Continued)

FOREIGN PATENT DOCUMENTS

EP    1026602 A2    8/2000
EP    1073223       1/2001

(Continued)

OTHER PUBLICATIONS

"Avipix Products," [http://web.archive.org/web/20011219115055/http://avipix.com/products.html], posted on the Internet on Dec. 19, 2001.*

(Continued)

*Primary Examiner* — Hung Dang
*Assistant Examiner* — Mishawn Dunn
(74) *Attorney, Agent, or Firm* — Robert D. Shedd; Jeffrey M. Navon

(57) ABSTRACT

Available storage media capacity for personal video recording increases continuously. metadata can be used to organize the recordings, search for content and access specific recordings. If metadata are embedded within the multimedia content itself, like DVB specific Service Information, which are multiplexed with the audio and video streams to form a MPEG-2 transport stream, a search based on this metadata would require an inefficient and time consuming search through all multimedia content stored. According to the invention metadata information is gathered, analyzed and processed to form metadata entities, which are amended by a reference to the content itself. A descriptor stream is formed from the resulting pairs of metadata entities and references to the content and is stored separately from the files comprising multimedia content. In this way, for data of an MPEG-2 transport stream the metadata can be accessed without a need to reparse the entire stream.

15 Claims, 1 Drawing Sheet

(56) References Cited

U.S. PATENT DOCUMENTS

| | | | |
|---|---|---|---|
| 7,778,518 B2 | 8/2010 | Kato et al. | |
| 2001/0000962 A1* | 5/2001 | Rajan | 345/302 |
| 2001/0027468 A1* | 10/2001 | Okura | 709/202 |
| 2001/0043784 A1* | 11/2001 | Shirata et al. | 386/21 |
| 2002/0035723 A1* | 3/2002 | Inoue et al. | 725/1 |
| 2002/0053084 A1 | 5/2002 | Escobar et al. | |
| 2002/0194607 A1* | 12/2002 | Connelly | 725/87 |
| 2003/0135464 A1* | 7/2003 | Mourad et al. | 705/50 |
| 2010/0003009 A1* | 1/2010 | Yoo et al. | 386/95 |

FOREIGN PATENT DOCUMENTS

| | | |
|---|---|---|
| EP | 1079623 | 2/2001 |
| EP | 1089565 A2 | 4/2001 |
| EP | 1193899 A1 | 4/2002 |
| JP | 10187742 A2 | 7/1998 |
| JP | 2000-175141 | 6/2000 |
| JP | 2000224257 A2 | 8/2000 |
| JP | 2000261742 A2 | 9/2000 |
| JP | 2001169247 A | 6/2001 |
| WO | WO 00/05884 | 2/2000 |
| WO | WO0005884 A1 | 2/2000 |
| WO | WO0106688 A | 1/2001 |
| WO | WO-0221845 A1 | 3/2002 |

OTHER PUBLICATIONS

Ceccarelli et al.: "Home multimedia systems: on personal video libraries" Multimedia Computing and Systems, 1999, IEEE International Conference on Florence, Italy, Jun. 7-11, 1999, pp. 1082-1085.

A. Hanjalic et al.: "Dancers: Delft Advanced News Retrieval System", Proceedings of the SPIE, SPIE, Bellingham, VA US, vol. 4315, pp. 301-310.

Patent Abstracts of Japan, vol. 2000 & JP 2000-175141, (Hitachi Ltd), Jun. 23, 2000.

Search Report Dated Nov. 22, 2001.

Sugimoto, "Digitai Library" Computer Software, vol. 16 No. 1, Jan. 18, 1999, pp. 57-63.

Hashimoto Etal A Study of Restructured Data Retrieval for Selective Viewing of Contents, Infomration Processing Society of Japan, vol. 98, No. 58, Jul. 9, 1998, pp. 1-8.

Owada et al. "Decomposing Index Information for Digital" Processing Society of Japan, vol. 98 No. 58, Jul. 9, 1998, pp. 17-24.

Gonno, et al., "Technical Perspective of Information Broadcasting" Annual Meeting, Image Information Media Society, Jul. 1998, pp. 88-89.

* cited by examiner

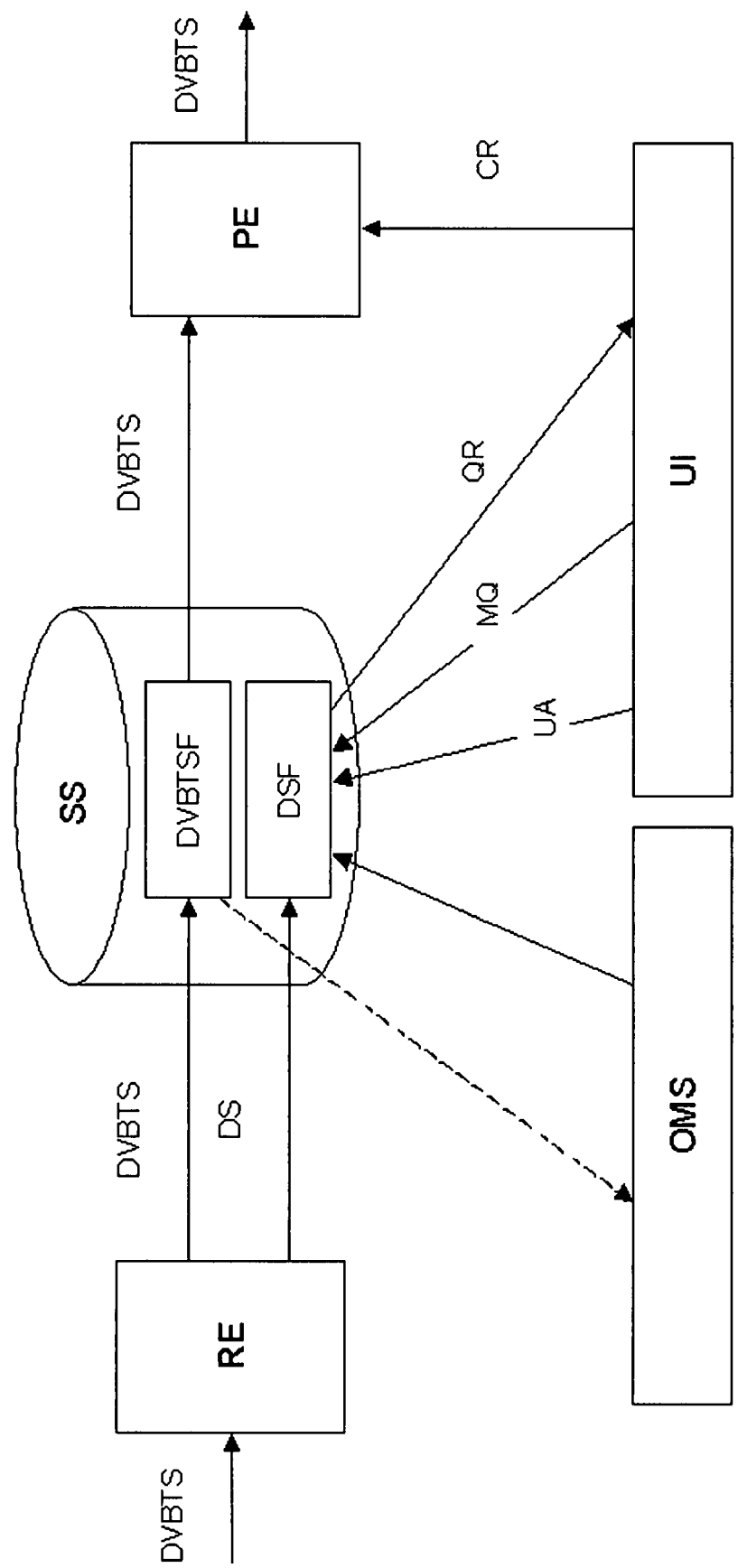

METHOD AND APPARATUS FOR SIMPLIFYING THE ACCESS OF METADATA

This application is a divisional of U.S. application Ser. No. 10/155,371, filed May 23, 2002 now U.S. Pat. No. 7,295,755, herein incorporated by reference.

FIELD OF THE INVENTION

The invention relates to a method and to an apparatus for simplifying the access of metadata, which are associated with a file comprising multimedia data or a part of said file, especially for describing the content of said multimedia data and/or searching said file or file part among a plurality of files comprising multimedia data, wherein the metadata are originally multiplexed with said multimedia data.

BACKGROUND OF THE INVENTION

Available storage media capacity for personal video recording increases continuously, approximately doubling every 2 years. Currently it is possible to store about 20 full-length movies on a single 100 GByte hard disk. In 2005, it will likely be possible to store about 80 movies on a single 400 GByte hard disk.

Similar figures apply to optical recording: currently about 5 GByte can be stored on a single layer single sided DVD disc but the DVR recorder as a successor of the today's DVD recorder will allow storage of up to 35 GBytes on a corresponding disc. Furthermore, two or even more layers can be used per side and these can be applied to both sides of the disc. Finally, it is possible to combine several discs in a special magazine.

This enormous amount of data requires new ways to organize the recordings, search for content and access specific recordings, because it is no longer possible to find recordings in a user's book shelf by just looking at the video cassettes/discs and some annotations on their cover. One possible solution for this is to use so-called metadata, defined as data about data, for the recorded content.

Metadata can be embedded within the multimedia content itself. For example, the MPEG-2 systems standard as specified in ISO/IEC 13818-1 defines program specific information (PSI) which is multiplexed with the audio and video streams. Similarly, the DVB standard used for the transmission of digital television signals specifies Service Information (DVB-SI) included in a DVB compliant MPEG-2 transport stream multiplex.

Cecarelli et al.: "Home multimedia systems: on personal video libraries", MULTIMEDIA COMPUTING AND SYSTEMS, 1999, IEEE INTERNATIONAL CONFERENCE IN FLORENCE, ITALY, 7-11 Jun. 1999, LOS ALAMITOS, Calif., USA, IEEE COMPUT. SOC, US, 7 Jun. 1999, pages 1082-1085, XP010342599, ISBN: 0-7695-0253-9" describe a system, where Metadata are extracted from the multimedia content and are stored separately from the multimedia content in a Multimedia Database Management System (MM-DBMS). The described system stores the multimedia content on tape and stores the database of the MM-DBMS on hard disk. This approach is targeting a hard disk based archive system, where the extracted Metadata always stays within the device and is not intended for metadata exchange by means of removable media, like it is required for optical recording.

SUMMARY OF THE INVENTION

The invention is based on the recognition of the following fact. Given the availability of metadata multiplexed into the multimedia content itself it is possible to access the metadata directly from the bitstream, like the DVB-SI information directly from the MPEG-2 transport stream. However, for recorded data like a broadcasted DVB television signal which is recorded on a disc after reception, a search based on these metadata would require a full search through all multimedia content stored in order to collect that metadata. This is both inefficient and time consuming.

Therefore, a problem to be solved by the invention is to make metadata information multiplexed into the multimedia content itself more easily available for automatic or electronic access, in particular for metadata based searches, browsing or presentation engines. This problem is solved by the method disclosed in claim 1. An apparatus that utilizes this method is disclosed in claim 8.

According to the invention the metadata are extracted from the multimedia content multiplex. The extracted metadata are gathered and analyzed to form metadata entities, which are amended by a reference to the content itself. A descriptor stream is formed from the resulting pairs of metadata entities and references to the content and is stored separately from the files comprising multimedia content.

In this way the metadata attached to the multimedia content allow efficient and fast automatic content referencing, content location and automatic or electronic access.

Advantageously, the invention can be used for accessing metadata addressing a file or parts of a file recorded on a storage medium. In this case, processing the metadata is performed during a recording process of the files comprising multimedia content. Especially, for data of a recorded MPEG-2 transport stream this allows to access the metadata without a need to reparse the entire stream.

The processing of the metadata can be performed during the recording process of the files or file parts. This has the advantage that the metadata are immediately available for metadata based searches.

However, it can also by advantageous to perform the processing of the metadata in an offline pass after the recording process, e.g. if an MPEG transport stream is recorded as it is without demultiplexing of the elementary streams.

Furthermore, it can be advantageous to complete the metadata extracted from the multimedia content multiplex by metadata retrieved from another source, e.g. by metadata transmitted by a service provider via internet.

Also the metadata extracted from the multimedia content multiplex can be supplemented by inputs from the user, e.g. using a keyboard. This allows the user to make personal annotations.

Further advantageous embodiments of the invention result from the following description.

BRIEF DESCRIPTION OF THE DRAWINGS

Exemplary embodiments of the invention are described with reference to the accompanying drawing, which shows in:

FIG. 1 the processing of a separate descriptor stream comprising metadata.

DETAILED DESCRIPTION OF PREFERRED EMBODIMENTS

Exemplary embodiments of the invention are described in the following. Although the further description concentrates on the processing of an MPEG-2 transport stream, most embodiments can easily be generalised for use in any kind of multiplexed bitstreams comprising metadata.

In FIG. 1 a DVB compliant MPEG-2 transport stream DVBTS containing multimedia data and DVB-SI data represents the multimedia content multiplex. The multimedia data can comprise arbitrary data, but especially includes video and audio data. The DVB-SI data consists of metadata carrying Descriptors that are encapsulated into SI sections and SI tables and may stretch across multiple MPEG-2 transport packets, that are not necessarily consecutive inside the transport stream multiplex. For further details reference is made to the MPEG-2 systems standard ISO/IEC 13818-1.

The recording engine RE collects all the data bytes that belong to a given DVB-SI Descriptor from the MPEG-2 transport packets and it also memorizes a position reference inside the MPEG-2 transport stream where the DVB-SI Descriptor did become valid. Both the Descriptor data and the start position reference are stored. From time to time a Descriptor is collected that is meant as a replacement (update) for a Descriptor that has already been found in the same MPEG-2 transport stream before. This means that the previous descriptor becomes invalid. The recording engine then stores the end position reference alongside the already stored start position reference of the previous DVB-SI Descriptor. At the end of the MPEG-2 transport stream, the recording engine checks all stored DVB-SI Descriptors and stores an end position to every Descriptor that didn't become invalidated so far. The start position reference and end position reference as well as a reference to the stored MPEG-2 transport stream itself form a so-called Content Reference or a Content Locator. All pairs of Descriptor and Content Reference are arranged to form a Descriptor Stream DS, which is stored by the storage system SS separately from the MPEG-2 transport stream DVBTS. For this purpose arbitrary storage systems can be used, e.g. optical storage devices or hard disk drives. Usually, both the Descriptor Stream DS and the MPEG-2 transport stream DVBTS are stored in respective separate files DSF, DVBTSF on the same storage medium. However, for some applications it is also useful to store them on different storage media.

The Descriptor Stream can later be amended by any kind of Descriptor and Content Reference pairs. Other sources OMS than the MPEG-2 transport stream DVBTS can be used for retrieving the metadata. Especially, the metadata can be generated by automatic feature extraction, symbolized by the broken arrow in the FIGURE, or, the metadata can be downloaded from the Internet. User annotations UA can be added as well, using the user interface UI, which may comprise a graphical display and some manual input means like a remote control or a keyboard or some speech input means. The user interface UI can also be used to launch a metadata query MQ, e.g. for accessing a certain multimedia file or scene included in the stored DVB transport stream files.

The result of the metadata query, i.e. the corresponding Descriptor and Content Reference pairs, is given back to the user interface UI, especially, if the query results in more than one hit. For informing the user about the query result a corresponding display, e.g. showing a table of found files, or a speech output may be used. After the user chooses one among several found files, the Content Reference of the selected file is supplied to the playback engine PE for playback of the DVB transport stream comprising the requested file described by the Content Reference CR. However, if as a response to a query only a single file is found, the Content Reference CR and the respective DVB transport stream comprising the found file can also directly be supplied to the playback engine PE skipping the user selection process.

Instead of amending complete Descriptor and Content Reference pairs, it is also possible to update, modify or replace either a Descriptor or a Content Reference exclusively.

A Descriptor Stream may also be generated by a process completely independent from the recording engine described above. If the multimedia content does not carry embedded metadata, it would also be possible to store a Descriptor Stream in the same format, but the pairs of Descriptor and Content Reference are generated from out-of-band data (e.g. user annotations, internet downloads, feature extraction).

The Descriptors in the Descriptor Stream may also be stored in a different encoding. For instance it is beneficial to transcode DVB-SI Descriptors from their binary encoding into an XML encoding. Other transport or storage encodings may exist.

For some DVB-SI Descriptors (e.g. EPG data) it is important to know, from what table or context they have been extracted from. In such cases it is beneficial to store such context information together with the Descriptor, Content Reference pairs.

The invention includes the following advantages:

The separately stored Descriptor Stream allows for an easy and fast access to the metadata information by a metadata based search, browsing or presentation engine.

The separately stored Descriptor Stream allows for an easy and fast access to the metadata information by a metadata based search, browsing and presentation engine.

The separate Descriptor Stream can be stored on the same disc as the multimedia multiplex. If the disc is an exchangeable media (like e.g. an optical disc), the extracted metadata stored in the Descriptor Stream becomes exchangeable together with the stored multimedia content. That means the extracted metadata and the multimedia content form an exchangeable bundle.

In addition to, or instead of, the storage on the same disc, the separate Descriptor Stream can also be stored on a different disc or multiple different discs, to allow for the exchange of the extracted metadata. This is beneficial for archive functionality and for other kinds of metadata processing.

Compared to a system based on a Multimedia Database Management System (MM-DBMS) as described by Cecarelli et al., the proposed direct storage of a Descriptor Stream during recording offers the following advantages. It is much less performance consuming, e.g. in view of real-time constraints, compared to the insertion and indexing overhead that is typically involved by a MM-DBMS insert operation. If the database of the MM-DBMS would need to be stored on an exchangeable medium, the database import operations during disc insertion and the database export operations during disc eject become prohibitive. In other words, such a known MM-DBMS would not be suited for exchangeable media.

DVB-SI Descriptors become valid within the multimedia multiplex as soon as they are transmitted. They are either invalidated by the transmission of a Descriptor of the same Descriptor type but with different values, or, by the end of the transmission. Having a Descriptor Stream allows for the addition of validity information (start, end) that is more convenient to use.

Descriptors from different origins may come in different encodings. The storage of a separate Descriptor Stream offers a way to have a unified encoding for the Descriptors (e.g. XML).

Descriptors may have been generated by an offline process or transmitted as out of band data. A separate Descriptor Stream offers a possibility to store all these Descriptors together.

The invention is applicable to all kinds of electronic multimedia content referencing and content location, for instance in connection with DVR standardisation, metadata, Content Referencing, Content Location, Personal Video Recorder, Personal Digital Recorder, Optical Storage, Hard Disk Storage, Home Server, and Web Enabled Storage.

What is claimed is:

1. A data storage device having stored thereon digital data comprising:
   a transport stream comprising multimedia content and metadata, said transport stream being a multiplexed stream and comprising at least one audio or video stream and said metadata, wherein said metadata comprise a first descriptor; and
   a descriptor stream comprising a second descriptor and a reference, wherein said second descriptor and said first descriptor are equal and wherein said second descriptor and said reference are related to said multimedia content and said reference points to a position inside said at least one audio or video stream within said multiplexed stream, and wherein said descriptor stream is stored in a single file separate from said multiplexed stream on said data storage device.

2. The data storage device of claim 1, wherein said data storage device comprises an optical disc.

3. The data storage device of claim 1, wherein said data storage device is exchangeable between different systems.

4. The data storage device of claim 1, wherein said transport stream comprises an MPEG transport stream.

5. The data storage device of claim 1, wherein said descriptor stream comprises a plurality of pairs of one second descriptor and one reference each, wherein the references point to different positions within said at least one audio or video stream.

6. The data storage device of claim 1, wherein said second descriptor comprised in the descriptor stream is in XML format.

7. The data storage device of claim 1, wherein said second descriptor comprises information describing a multimedia scene included in said transport stream data, and said reference enables accessing the described scene.

8. A multimedia player comprising:
   means for retrieving transport stream data from a multiplexed stream stored on a data storage device, wherein said transport stream data comprises multimedia content in at least one audio or video stream and metadata, the metadata comprising a first descriptor;
   user interface means for launching a metadata query;
   means for retrieving from said data storage device, responsive to said metadata query, a descriptor stream comprising a second descriptor and a reference, wherein said second descriptor and said first descriptor are equal and wherein said second descriptor and said reference are related to said multimedia content and said reference points to a position inside said at least one audio or video stream within said multiplexed stream, and wherein said descriptor stream is retrieved from a single file that is separate from said multiplexed stream; and
   means for accessing a multimedia scene included in the transport stream based on a descriptor and reference pair of said descriptor stream.

9. The multimedia player of claim 8, further comprising means for updating or supplementing said first or second descriptor or said reference retrieved from within the descriptor stream with other data.

10. The multimedia player of claim 8, further comprising local storage means for storing said descriptor stream for archiving or metadata processing.

11. The multimedia player of claim 8, wherein said data storage device comprises an optical disc.

12. The multimedia player of claim 8, wherein said data storage device is exchangeable between different multimedia players.

13. The multimedia player of claim 8, wherein said transport stream comprises an MPEG transport stream.

14. The multimedia player of claim 8, wherein said descriptor stream comprises a plurality of pairs of one second descriptor and one reference each, wherein the references point to different positions within said at least one audio or video stream.

15. The multimedia player of claim 8, wherein said second descriptor comprised in the descriptor stream is in XML format.

* * * * *